Feb. 8, 1949.  J. H. NILSON ET AL  2,460,999
TACHOMETER GENERATING APPARATUS
Filed Aug. 2, 1947  3 Sheets-Sheet 1

INVENTORS.
James H. Nilson
Vernon C. Westberg
BY
Thiess, Olsen & Mecklenburger
Attorneys

Feb. 8, 1949.   J. H. NILSON ET AL   2,460,999
TACHOMETER GENERATING APPARATUS
Filed Aug. 2, 1947   3 Sheets-Sheet 2

INVENTORS.
James H. Nilson
Vernon C. Westberg
By Thiess, Olson & Mecklenburger.
Attys Feb. 8, 1949.  J. H. NILSON ET AL  2,460,999
TACHOMETER GENERATING APPARATUS Filed Aug. 2, 1947  3 Sheets-Sheet 3

INVENTORS.
James H. Nilson
Vernon C. Westberg
BY
Thiess, Olson & Mecklenburger
Attorneys Patented Feb. 8, 1949

2,460,999

UNITED STATES PATENT OFFICE 2,460,999

TACHOMETER GENERATING APPARATUS

James H. Nilson, Wilmette, and Vernon C. Westberg, Chicago, Ill., assignors to Sun Electric Corporation, Chicago, Ill., a corporation of Delaware Application August 2, 1947, Serial No. 765,744

14 Claims. (Cl. 171—209)

This invention relates to a generating apparatus, more particularly to tachometer generator apparatus of the direct current type, including a generator and a rectifier, it being an object of the invention to provide improved apparatus of this character.

Electrical tachometers have heretofore been provided. Such tachometers usually include a generator generating a voltage of certain prescribed characteristics and an instrument into which the voltage of the generator is fed. The instrument and the generator are calibrated together whereby the instrument provides a suitable speed indication of the engine to which the generator is connected. The prior tachometer apparatus is subject to limitations in its use arising from the limitations of the instrument cooperating with the generator. For example, if the tachometer generator is of the alternating current type, variations of the generator speed cause corresponding variations in the frequency of the voltage output. Feeding such a voltage directly into an indicating instrument introduces limitations since the indicating characteristics of the instrument depend upon the frequency of the voltage supplied to it as well as on the amplitude. Furthermore, prior art tachometer apparatus has been limited in its application due to the inherent characteristics of the generator itself. Thus, the voltage output of the generator is not always a simple function of its speed over a substantial range of speed variation, and moreover, the voltage output characteristics of the tachometer may vary with the direction of the generator rotation.

Accordingly, it is a further object of the invention to provide improved tachometer generating apparatus of the character indicated which will have substantially the same output characteristics irrespective of the direction of rotation.

It is a further object of the invention to provide improved tachometer generating apparatus of the character indicated having a substantially linear relationship between the generator output and the speed thereof throughout a wide range in speed.

It is a further object of the invention to provide improved generating apparatus for generating a voltage cycle consisting of pulses separated by intervals of zero voltage.

It is a further object of the invention to provide improved tachometer generating apparatus for generating a voltage cycle consisting of pulses separated by intervals of zero voltage in which the intervals of zero voltage and the intervals of the voltage pulses remain a constant percentage of the total generating cycle interval irrespective of the speed.

It is a further object of the invention to provide improved generating apparatus of the character indicated in which rectification of the voltage occurs at substantially the same point in the generating cycle irrespective of the direction of rotation.

It is a further object of the invention to provide apparatus for generating voltage pulses separated by intervals of zero voltage there being a sharp variation of voltage at the initial and terminal portion of the zero voltage portion.

In carrying out the invention in one form a reversible direct current generator is provided, comprising means for generating alternate positive and negative voltage pulses separated by intervals of zero voltage with rapid changes in voltage at the initial and terminal portions of said zero voltage intervals, means for commutating one of said positive and negative pulses, and magnetic means for operating the commutating means during the intervals of zero voltage. More particularly the generator comprises a pair of pole pieces, a source of flux, windings on the pole pieces, and a rotor rotatable relative to the pole pieces for producing alternate periods of constant flux and varying flux, the rotor including means for providing a rapid change of flux at the initial and terminal portions of the constant flux periods.

For a more complete understanding of the invention reference should be had to the accompanying drawings in which.

Referring more particularly to the drawings the invention is shown embodied in tachometer generating apparatus 10, including a generator 11 and a rectifier 12 structurally interrelated with each other so as to produce a direct current voltage output proportional to the rotational speed and independent of the direction of rotation mounted within a shielding housing 13.

The generator 11 and the rectifier 12 form a unitary assembly held within the housing 13 at the left end thereof by means of screws 14, the housing being made of two substantially rectangular cup-shaped metallic members 15 and 16 attached together substantially centrally thereof by bolts (not shown) to form a complete enclosure. Housing portions 15 and 16 are separated from each other by a metallic ring 17 and gaskets 18, the metallic ring forming part of a continuous magnetic shield including housing portions 15 and 16 whereby stray fields external to the apparatus do not affect the calibration thereof. A flange ring 19 spaced from housing member 15 by a gasket 20 is held to the generator by means of the bolts 14 and includes a portion which is internally threaded to receive a correspondingly threaded bushing 21, the bushing being riveted over at its inner end to form a rigid and permanent connection with flange ring 19. The bushing 21 has a central bore and includes an external shoulder against which an internal flange of the flanged nut 22 bears, the flanged nut being internally threaded for attachment to a corresponding member on whatever apparatus the rotational speed of which is desired. The flanged nut 22 is assembled to the apparatus by first placing the bushing 21 through an opening in the flanged nut and thereafter threading the bushing into the flange ring 19. A flexible shaft 23 and a connecting member 24 at one end thereof are attached to the shaft of the generator and rectifier whereby the tachometer apparatus is driven.

The voltage produced by the generator 11 is rectified by rectifier 12 and is fed to an output terminal 25 mounted on the casing portion 15, the movable contact of the rectifier being in contact with the frame whereby the complete circuit of the apparatus may be made between the terminal 25 and any portion of the metallic casing or the metallic portion of the machine to which the tachometer apparatus is attached.

Referring to Figs. 1, 2, 4, 5 and 7, the generator 11 embodies a frame 26 supporting a stationary magnetic structure, including the permanent magnets 27 and 28, and the pole pieces 29 and 31, and inductor mechanism structure including the rotors 32 and 33 mounted on a shaft 34, and windings 35 and 36 cooperating respectively with the pole pieces 29 and 31. The frame 26 has a rear end member 37 and a front end member 38 integral with a pair of rigid base members 39 and 41, the end members respectively holding ball bearings for supporting shaft 34. The end member 37 is provided with screw holes receiving screws 14 for supporting the mechanism within casing 13, the entrance thereinto by virtue of the bearing in end member 37 being closed by the shaft seal 42.

Figures 14, 15, 16:
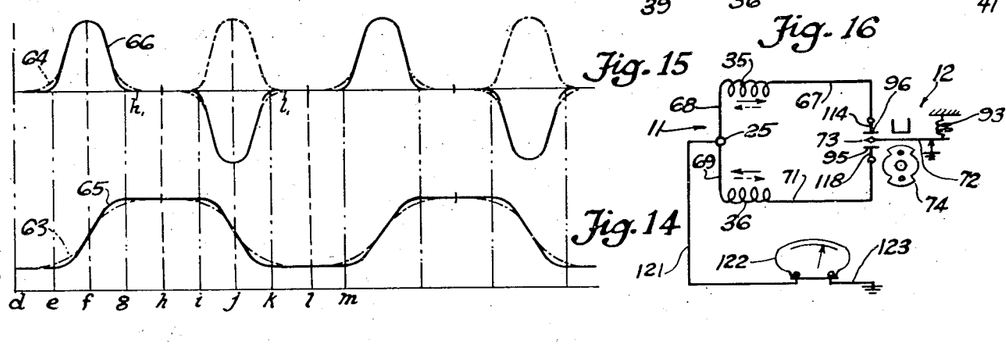
Fig. 14 is a diagrammatic representation of the flux distribution in the generator during the operation of the invention.
Fig. 15 is a diagrammatic representation of voltage waves for explaining the operation of the invention.
Fig. 16 is a diagrammatic representation of the generator and rectifier embodying the invention in operation.

Generator 11 is of the inductor alternator type in which the permanent magnets 27 and 28 cooperate with the pole pieces 29 and 31 and the rotors 32 and 33 to produce a flux wave through the windings 35 and 36 which is always positive. That is, the flux through the windings 35 and 36 is always in the same direction, but it follows a wave form having a constant flux of greater magnitude and a constant flux of lesser magnitude separated by an interval of varying flux during which the flux changes from the one magnitude to the other (Fig. 14).

The pole piece 29 is generally E-shaped in form, having three legs 43, 44, and 45, connected by a base 46, the center leg 44 carrying the winding 35, and the legs 43 and 45 being magnetically connected with magnets 27 and 28 (shown dotted in Fig. 7), respectively. The dimensions of the various parts of pole piece 29 may be chosen so as to conduct the flux produced by the magnets without saturation in order that the desired voltage for the particular speed range desired may be produced without distortion. While pole piece 29 may be made of solid material, it is preferred to construct it by superimposing a series of laminations which, for example, may be formed by stamping from a larger sheet of material. In the stamping process the laminae forming the legs 43, 44 and 45 are formed to lie in the same plane, but the portions 47 and 48 of the base lying respectively between the center leg 44 and the outer legs 43 and 45 are offset by an amount which preferably may be approximately the thickness of the individual laminations as is shown best in Figs. 4 and 5. When the individual laminations are assembled to form pole piece 29 one lamination is merely laid on top of the other and the completed group of laminations is assembled to magnets 27 and 28 so that the offset portions 47 and 48 lie outwardly of the structure, as shown. Consequently the central leg lies inwardly thereof and the innermost lamination of the central leg has its lower edges chamfered to remove the sharp edge for purposes to be described subsequently in this specification. The pole piece 31 is formed similarly to pole piece 29 having a central leg 44a and two outer legs and a base including offset portions therebetween. The pole piece 31 is assembled to the magnetic structure so that the offset portions thereof lie outwardly and the central leg lies inwardly.

Magnets 27 and 28 extend the full length of the outer legs 43 and 45, and are provided with grooves at each end through which the bolts 49 extend for holding pole pieces 29 and 31 to the magnets and to the base portions 39 and 41 of the frame, the length of the magnets being such as to space the central legs of the pole pieces apart by an amount greater than the largest diameter of the rotors by the necessary air gap.

The rotor 32 functions in connection with the central legs under the base of the pole pieces, whereas rotor 33 functions in connection with the central legs at the forward ends thereof, the windings 35 and 36 being spaced between the two rotors.

The winding 35 consists of the necessary number of turns of insulated wire wound on a form or bobbin having a central opening of sufficient size so that the winding may be placed upon the central leg 44 of pole piece 29. The winding is held on the pole piece by a metallic strip 51 having a bent upward portion at the front end to engage the coil and downwardly bent portion at the rear end to engage the rear edge of base 46. The winding 36 is similar to winding 35 and is held upon the center leg of pole piece 31 by means of a metallic strip 52 in a manner similar to metallic strip 51.

The magnets 27 and 28 are oriented so that corresponding poles, for example the north poles, are connected to the outer legs of pole piece 29 and the south poles are connected to the outer legs of the pole piece 31.

Consequently the flux through the windings is always in the same direction. That is, assuming that the flux lines begin at the north poles and end on the south poles, the flux will pass through the outer legs 43 and 45, through the base portions 47 and 48, respectively, through the central leg 44, through either rotor 32 or 33 depending upon the rotational positions, and then through central leg 44a of pole piece 31 and the outer legs thereof to the south poles of the magnets. In one position of rotor 33 the flux travels through to the forward end of central leg 44 (Fig. 10), thereby linking with the windings, and when this rotor is turned through 90° (Figs. 7 and 8) the rotor 32 will be in a position providing a flux path from the magnets diverting flux from the windings. The rotors include interrupted portions to provide a greater reluctance to the passage of the magnetic flux when turned to the horizontal positions. As a consequence of the variations of flux through the central legs a voltage is generated in windings 35 and 36.

Figure 5:
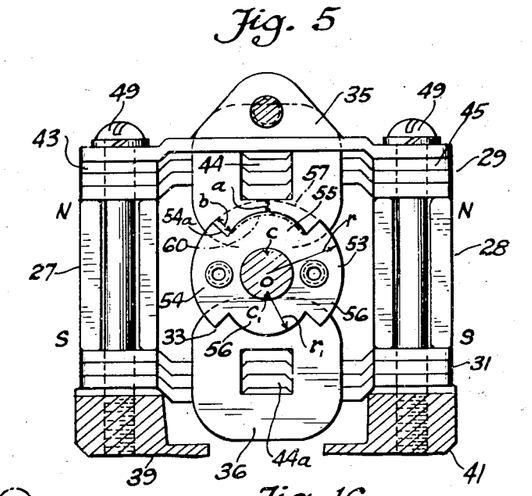
Fig. 5 is a sectional view on a larger scale taken substantially along lines 5—5 of Fig. 2.

Referring to Fig. 5, the rotor 33 of the interrupted type, has a pair of diametrically opposite sectors 53 and 54 separated by another pair of diametrically opposite sectors 55 and 56, the sectors 53 and 54 being of greater radius than the sectors 55 and 56. Each of the sectors extends through 90° whereby the circumferential lengths of sectors 53 and 54 are equal to the circumferential distance between sectors 53 and 54, the circumferential length of the various sectors preferably being approximately twice that of the width of the central legs of the pole pieces. The sectors 53 and 54 have a radius $r$ and are constructed with the center $o$, the center of the shaft 34 as a center. The sectors 55 and 56 are arcs of circles, but are constructed from centers $c$ and $c_1$ displaced radially outward from the center $o$ and lying on a line bisecting the sectors 55 and 56, the radius of these sectors being $r_1$ which is less than the radius $r$. A dot dash line arc 57 with $o$ as a center and a radius $r$ has been scribed from which it may be seen that the sector 55 is less in radial extent than the sector 53, for example, by an amount $a$ at the center of sector 55 and by an amount $b$ which is greater than $a$ where the sector 55 adjoins sectors 53 and 54, $b$ being greater than $a$ by an amount determined by the displacement of the center $c$ from the center $o$. The sector 56 is identical with sector 55 in its dimensions, and the rotor 32 has the same dimensions for parts corresponding to rotor 33. Rotor 32 accordingly has diametrically opposite sectors 58 and 59 of greater radius $r$ and spaced therebetween it has diametrically opposite sectors 61 and 62 of lesser radius $r_1$.

Figure 4:
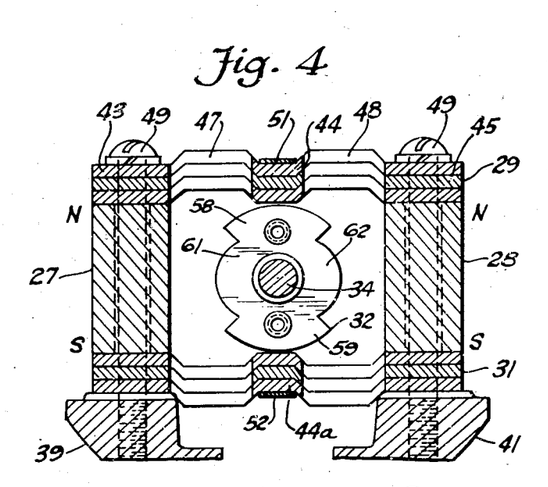
Fig. 4 is a sectional view on a larger scale taken substantially along lines 4—4 of Fig. 2.

Rotor 32 is displaced 90° rotationally on shaft 34 relative to rotor 33 so that when sectors 53 and 54 of rotor 33 are underneath the legs 44 and 44a of the pole pieces, sectors 61 and 62 of rotor 32 are also there underneath. Consequently there is a small gap between the central legs and rotor 33 and a large air gap between the central legs and rotor 32. In this position a flux path through rotor 33 is complete and passes through windings 35 and 36. After a rotation of 90° or a quarter of a revolution the sectors 55 and 56 of rotor 33 are underneath legs 44 and 44a and the sectors 58 and 59 of rotor 32 are thereunderneath at the rear thereof (Figs. 5 and 4). Accordingly, the rotor 32 has a small air gap with the pole pieces and the rotor 33 has a large air gap. Consequently, the flux path through the rotor 33 has been interrupted and replaced by a shunt flux path through rotor 32. Due to this flux change a voltage has been generated.

In one satisfactory structure the following rotor and other dimensions obtained: $r$ equal to .356 inch, $r_1$ equal to .219 inch, centers $c$ and $c_1$ displaced from center $o$ by .094 inch, the spacing between the central legs equal to .750 inch, maximum width of the central legs equal to .248 inch but having the edges chamfered so that the minimum width is equal to .187 inch. The edges where the sectors start and stop are made as sharp as possible. These dimensions are exemplary only and may be varied without departing from the invention so long as the air gap formed by the smaller sectors varies from one value at the center to a larger value at the edge. From the dimensions given, it will be seen that the air gap at the center of the central leg has a constant value of .01 inch for the sectors 53, 54, 58 and 59 and a value of .063 inch for the center of sectors 55, 56, 61 and 62.

Since the circumferential extents of the various sectors are approximately twice the width of the central legs of the pole pieces and since the sectors 53 and 54, as well as 58 and 59, are of constant radius there will be no change in flux through the central legs of the pole pieces during a considerable portion of the movement of these sectors underneath the pole pieces. During this portion of the rotation there will be no voltage generated in the windings. Correspondingly, when sectors 55 and 56 are directly underneath the central legs of the pole pieces, even though these sectors vary in radius from center $o$, the rate of change of the gap is small and there will be no change in flux through the windings and hence no voltage generated. However, as the front edges of the sectors 53 and 54 approach the central legs of the pole pieces (assuming clockwise rotation), the flux through the central legs of the pole pieces changes from a small or substantially zero value to a greater value and voltage pulses will be generated. Similarly, when the rear or trailing edges of sectors 53 and 54 approach the central legs of the pole pieces and pass underneath thereof, the flux changes from a larger value to a minimum or substantially zero value, and negative voltage pulses will be generated. Since there are four sectors on the rotors there will be two complete cycles of voltage generated during each revolution.

Rotors 32 and 33 may be made of any readily permeable magnetic material, such as soft iron, and are preferably formed of laminations or stampings riveted together.

In Fig. 14 the solid curve 65 shows the variation of flux through the windings with the construction of the invention, and the dotted curve 63 shows the variation of flux if the sectors 55, 56, 61 and 62 had a constant radius with the center $o$. In Fig. 15, the solid curve 66 shows the voltage generated by the generator of the invention, and the dotted curve 64 shows the voltage which would be generated if the sectors 55, 56, 57 and 58 were constructed with constant radius and with center $o$. The dot dash curve indicates the rectified voltage pulses.

Figures 6, 7, 13:
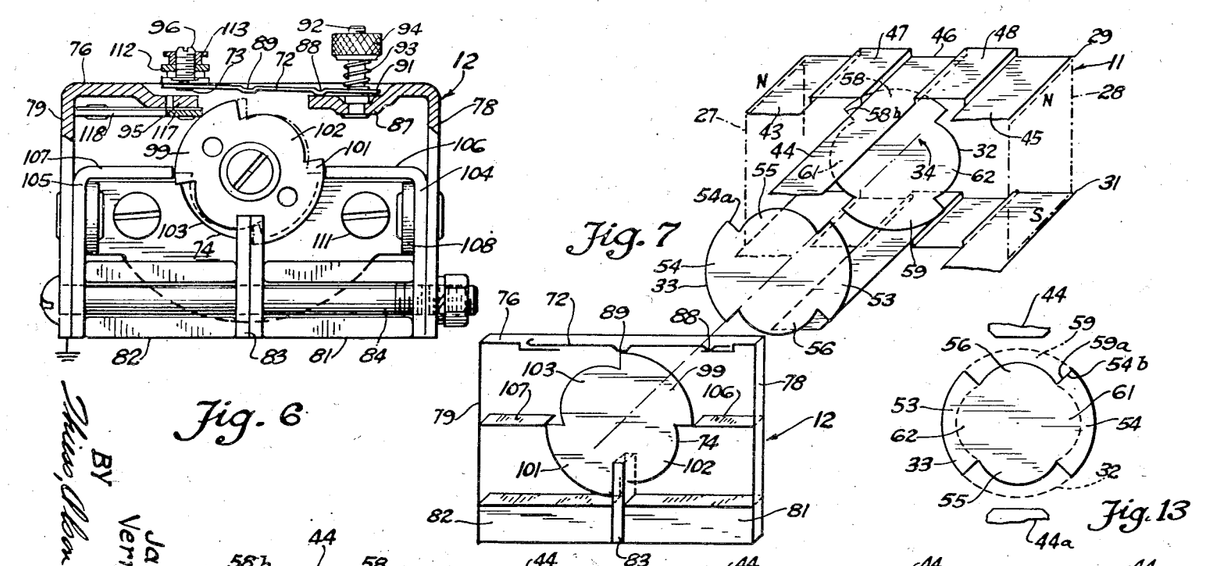
Fig. 6 is a view similar to Fig. 3 with the rectifier rotor in a different position.
Fig. 7 is a fragmentary diagrammatic perspective view of the apparatus shown in Figs. 1 and 2.
Figs. 8 to 13 are fragmentary axial views of the generator with the rotors thereof in different positions of rotation.

Referring to Figs. 4, 5, and 7, rotor 33 being in a horizontal position and rotor 32 in a vertical position, the flux through rotor 33 is a minimum and is substantially zero since the air gaps between sectors 58 and 59 and the leg 44 may be in the order of one-hundredth of an inch and the air gap between the sectors 55 and 56 and the leg 44 may be in the order of six-hundredths of an inch. That is, due to the large air gap of rotor 33 the flux through rotor 33 is small, and due to the small air gap of rotor 32 the maximum amount of flux is shunted. These two factors result in the minimum flux through rotor 33 and the windings and establishes the origin $d$ of the curves of Figs. 14 and 15. If the sector 55 had a constant radius with $o$ as a center, as shown by the dot dash line 60 (Fig. 5), as the rotors rotated the average gap between the sector 55 and the central leg 44 would remain constant for only a very limited time since the leading edge 54a of sector 54 approaching the front edge of leg 44 tends to decrease the gap. Consequently, the flux would tend to increase as the rotors rotate clockwise almost as soon as rotor 33 moves from the position of Fig. 7 toward that of Fig. 8 as shown by the dotted curve 63. Correspondingly, a rising voltage would be generated in the coils as shown by curve 64 of Fig. 15. However, due to the fact that the actual gap from the front edge of the central leg to the sector 55 is increasing because of the distance $b$ being greater than distance $a$, and the front edge of leg 44 is chamfered, as the leading edge 54a approaches polar portion 44 (Fig. 8), the average gap therebetween remains constant for a longer time, thereby providing a flux path of constant and maximum reluctance. At the same time, the trailing edge 58b of sector 58 is approaching the front edge of leg 44, but due to the constant radius of sector 58 the reluctance of this gap is not increased. Hence, the flux curve remains virtually flat from $d$ to $e$ or from the position of Fig. 7 to that of Fig. 8. Accordingly, the voltage curve remains flat in this interval. As the leading edge 54a of sector 54 more closely approaches the edge of polar portion 44 (from Fig. 8 to beyond it), the average gap decreases quite abruptly due to the approaching edges, thereby effecting increased rate of flux change through leg 44 with a consequent increase in voltage generated. When the trailing edge 54b of sector 54 approaches the front edge of leg 44, the leading edge 59a of sector 59 approaches leg 44 and shunts flux away from rotor 33. Due to the decreased gap at 59a this shunting is rapid with a consequent rapid change in voltage from zero to a negative value.

As will be described subsequently in this specification, it is necessary for proper rectification, irrespective of direction of operation, that the voltage between the positive and negative pulses be zero for an interval of time susbstantially equal to the duration of the voltage pulses with a rapid change from the zero voltage to a rising voltage pulse, a rapid change from the decreasing voltage of positive pulse to zero voltage, a rapid change from zero voltage to the decreasing voltage pulse and a rapid change from the increasing negative pulse to zero voltage. To accomplish this it is necessary that the flux changes at the beginning and end of the voltage pulses be rapid and that the flux changes between the voltage pulses be substantially zero. This is effectuated by constructing the rotors 32 and 33, as has already been described.

Bearing the foregoing structure and manner of operation in mind, a full cycle of flux changes and voltage generation may be described by considering Figs. 7 to 13. In Figs. 8 to 13 the rotors 32 and 33 are shown superimposed on each other and are shown in solid and broken lines respectively in order that the positions of the sectors relative to legs 44 and 44a may be observed simultaneously.

In Fig. 7, as has been indicated, the rotor 33 being horizontal and the rotor 32 being vertical, the flux through rotor 33 is small, this position forming the origin $d$ of the curves on Figs. 14 and 15. During the movement of rotor 33 from the position in Fig. 7 to that in Fig. 8, about one sixteenth of a revolution or one eighth of a voltage cycle, represented by the portion of the curves from $d$ to $e$, the flux (curve 65) through rotor 33 remains constant due to the constant average large gap of sectors 55 and 56 and the constant small gap of sectors 58 and 59 with legs 44 and 44a respectively. Consequently, the voltage (curve 66) in this interval is zero. If during this interval the radii of sectors 55 and 56 were constant and used the center $o$, the average gap from legs 44 and 44a to sectors 55 and 56 would be decreasing with resulting increase in flux and consequent increase in voltage as shown by curves 63 and 64.

Figure 8:
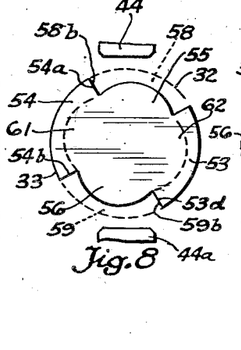

As the leading edge 54a moves beyond Fig. 8 and closely approaches the front edge of central leg 44 (similarly for leading edge 53a of sector 53 and front edge of leg 44a), the gaps between sectors 54 and 53 and legs 44 and 44a respectively decrease quite rapidly. At this time the gaps formed by sectors 58 and 59 are still substantially constant. Accordingly, flux is rapidly directed from rotor 32 through rotor 33 and the voltage changes rapidly from its zero to a rising value as shown respectively in curves 65 and 66. As the leading edge 54a moves underneath leg 44 and edge 53a moves underneath leg 44a, prior to the position shown in Fig. 9, the trailing edge 58b of sector 58 and the trailing edge 59b of sector 59 move underneath legs 44 and 44a respectively and the two rotors begin to divide the flux between them in favor of rotor 33. The area of sectors 54 and 53 forming a flux path is increasing and the area of sectors 58 and 59 forming a flux path is decreasing. As a result the flux through rotor 33 increases until the position shown in Fig. 8 even though at a slower rate as shown in Fig. 14 from $f$ to $g$ and the voltage decreases from its maximum value to zero voltage. However, as the leading edges 54a and 53a move away from the rear edge of legs 44 and 44a the trailing edges 58b and 59b also move away from legs 44 and 44a. Consequently, the short circuiting effect of rotor 32 is suddenly removed and flux change from rising to a constant value is rapid. Also, due to the displaced centers of sectors 55 and 56 the average gap from rotor 33 to legs 44 and 44a is more suddenly changed to its small value. Accordingly, the voltage change from the decreasing to zero value at $g$ is rapid. As sectors 54 and 53 move into central position under legs 44 and 44a (Fig. 10) the air gap at rotor 33 is constant at a low value and that for rotor 32 is constant at a large value. Thus the flux through the windings is constant and the voltage generated is zero. The flux and voltage for this position are shown at $h$ in Figs. 14 and 15.

In moving from the positions of Fig. 7 to Fig. 10, from $d$ to $h$, the voltage has changed from zero to a maximum and back to zero. The minimum and maximum flux values and the maximum voltage may be substantially the same, if the short circuiting rotor 32 were not present and the center of sectors 55 and 56 were at $0$, even though following curves 63 and 64, i. e. with slow changes to rising flux and voltage at *e* and slow changes to high flux and zero voltage at *g*. The construction of the invention makes the flux and voltage changes rapid at these and similar points with consequent substantial intervals of zero voltage. By constructing the sectors so that they are of equal angular extent and constructing the smaller sectors to provide a varying gap, the portions of zero voltage are of substantially the same extent as the duration of the voltage impulses, and, moreover, there is a rapid change from zero voltage to the voltage pulses.

Figures 9, 10, 11:
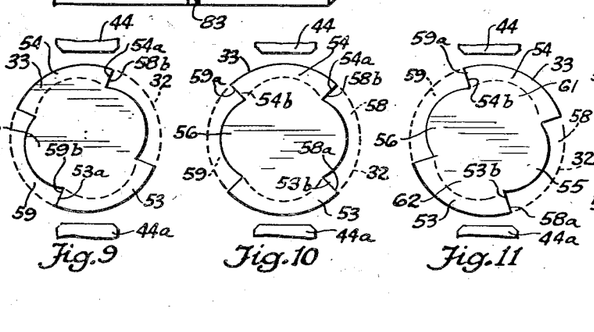

As the rotors move from the position shown in Fig. 10 toward that shown in Fig. 11 corresponding to movement from *h* to *i* on Figs. 14 and 15, the flux through rotor 33 remains constant with a zero voltage output until the trailing edges 54b of sector 54 and 53b of sector 53 approach the leading edges of legs 44 and 46a respectively. This is due to the constant radius of sectors 54 and 53 and the constant average gap of sectors 61 and 62. When the trailing edges 54b and 53b and the leading edges 59a and 58a approach immediately adjacent and just beyond the leading edges of legs 44 and 44a in Fig. 11, the average gap at rotor 33 suddenly increases and the average gap at rotor 32 decreases. Consequently, rotor 32 suddenly diverts flux from rotor 33 which together with the sudden increase in air gap from sector 54 to sector 56 causes a sudden decrease in flux through rotor 33 and windings 35 and 36. Since the flux is decreasing it produces a negative voltage impulse with a sharp variation from zero voltage to the negative value as shown by portions *i* to *j* in Figs. 14 and 15. The sudden short circuiting effect of rotor 32 and the sudden increase of gap at rotor 33 are due also to the fact that the sectors 56 and 55, and 61 and 62 have displaced centers so that the air gaps initially are larger. Then as trailing edges 54b and 53b and leading edges 59a and 58a move across legs 44 and 44a, the area of sectors 54 and 53 forming a flux path is decreasing and the area of sectors 58 and 59 forming a flux path is increasing. Accordingly, the flux through rotor 33 continues to decrease until trailing edges 54b and 53b approach the position of Fig. 12 corresponding to *k* of Figs. 14 and 15. As the trailing edges 54b and 53b move away from the trailing edges of legs 44 and 44a, Fig. 12, the average air gap to rotor 33 changes suddenly to its maximum value and the flux through the windings becomes small as shown from *k* to *m* of Fig. 14. Up to point *k* the voltage, while still negative, has been increasing and approaching zero. When the flux suddenly reaches its lowest value, the voltage also reaches zero. Then as trailing edges 54b and 53b and leading edges 59a and 58a move farther away from the rear edges of legs 44 and 44a, the average gap to rotor 33 (sectors 56 and 55) remains the same and the gap of sectors 58 and 59 at legs 44 and 44a remains the same.

Figure 12:
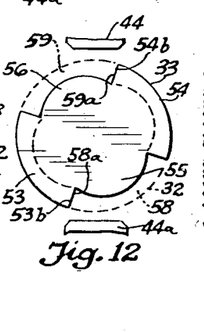

Consequently, the flux remains constant from the position of Fig. 12 to that of Fig. 13, *k* to *l*, and the voltage generated remains zero since the flux is constant.

As thus far described, the rotors have been moved through one half of a revolution. The cycle continues in the same manner with the completion of another cycle in the remaining half revolution.

For conducting the voltage pulses generated to the rectifier 12 the winding 35 is provided with a pair of leads 67 and 68, and winding 36 is provided with a pair of leads 69 and 71, Fig. 16. Lead 68 is connected to output terminal 25, lead 67 is connected to one terminal of rectifier 12, lead 69 is connected to the output terminal 25, and lead 71 is connected to another terminal of the rectifier.

Rectifier 12 disclosed and claimed in our copending application entitled Rectifier apparatus, filed August 2, 1947, Serial Number 765,745, and assigned to the same assignee as the present invention, is of the synchronous type in that it is operated from the generator shaft. It comprises a reed or vane 72 carrying a contact 73 at its forward end and a magnetic circuit including a segmental rotor 74 for directing magnetic flux to and from the reed for causing vibrating movement thereof. The construction of the rotor, the vane, and the magnetic circuit are such that contact 73 makes and breaks circuits with cooperating contacts when the voltage from generator 11 is at zero value. Consequently no sparking occurs thereat. Moreover, the intervals of zero voltage being of substantial length, small variations in the time of contact operation are not serious since the voltage is still zero at contact operation. This is advantageous for producing uniform operation irrespective of the direction of rotation as will be more fully explained.

Referring to Figs. 1, 2, 3, 6, 7 and 16, the reed 72 is carried on a magnetic yoke 75 associated with a pair of permanent magnets 81 and 82 which supply magnetic flux for effecting reed operation.

The yoke 75 is U-shaped, having a top member 76 and two end members or legs 78 and 79 extending therefrom, the legs and top preferably being integral with each other although separate parts may be fastened together. At the lower ends of legs 78 and 79 magnets 81 and 82 are arranged in alignment with a pole 83 between them, thereby forming structure having a generally rectangular outline, pole 83 being midway between the legs. Each magnet is provided with slots along both sides through which bolts 84 pass for holding magnets 81 and 82, pole 83, and yoke 75 in a rigid unitary arrangement. In top member 76 an elongated hole 35 (Fig. 1) is formed as by punching and a portion of the metal at each end thereof is formed into depressed portions 86 and 87 thereby providing a channel for receiving reed 72.

Reed 72 is a thin, flat metallic strip provided with a depressed portion or pivot 88 adjacent one end, and a depressed portion 89 substantially centrally thereof, the upper and lower contact 73 being at the other end. Pivot 88 bears against depressed portion 87, and to the right thereof is an extension 91 having a hole through which a threaded stud 92 attached to depressed portion 87 extends. A spring 93 surrounds stud 92 and is biased against extension 91 by the nut 94. By virtue of pivot 88, extension 91 is spaced away from portion 87 whereby spring 29 urges reed 72 toward its uppermost position (Fig. 6). In the lowermost position (Fig. 3) contact 73 touches contact 95, and in its uppermost position, contact 73 touches contact 96.

Rotor 74 may be formed of laminations having the same shape as rotors 32 and 33 which are assembled on a sleeve 97 such as by riveting over one end thereof, the assembly being slipped over the end of shaft 34 and adjustably held thereto by a bolt 98. The rotor cooperates with pole 83 and depressed portion 89 to complete a flux path through reed 72, is of about the same width as reed 72, and is placed so as to be substantially thereunderneath. Rotor 74 comprises a pair of diametrical sectors 99 and 101 spanning ninety degrees of arc alternating with a pair of sectors 102 and 103 also spanning ninety degrees of arc. Sectors 99 and 101 are of greater radius than sectors 102 and 103, thereby producing a rotor having an interrupted periphery, the change from a sector of one radius to that of another radius being along a radial line. The radii of the two groups of sectors are such that in the vertical rotor position there is only a very small gap between either sector 99 or 101 and depressed portion 89, and when the rotor is in the horizontal position there is a large gap between either sector 99 and 101 and depressed portion 89. While a rotor of the same shape as rotors 32 and 33 may be used for rotor 74 it is not essential that sectors 102 and 103 have their centers displaced from the center of the shaft.

The pole 83 is shown as including two pieces but it may be one solid member. Pole 83 extends the full width of yoke 12 and includes tips 100 extending upwardly on each side of the rotor beyond the extremity of sectors 102 and 103 so as to be in position for completing a flux path through rotor 74 in any position of rotation.

The magnets 81 and 82 are oriented with their north poles adjacent pole 83. Consequently, when rotor 14 is vertical (or prior to the position shown solid in Fig. 3), a flux path is completed from the north pole of magnet 81, through pole 83, the rotor, depressed portion 89, reed 72 including pivot 88, depressed portion 87, a portion of top member 76, leg 78, to south pole of the magnet 81. Similarly, there is a flux path from the north pole of magnet 82 through pole 83, the rotor, depressed portion 89, reed 72 including pivot 88, depressed portion 87, the portion of top 76 lying along each side of channel 85 and leg 79 to the south pole of the magnet. In this rotor position the gap between sector 99 (similarly for sector 101) and depressed portion 89 is small so the flux passes through the circuit described and the reed 72 is attracted to move into its lowermost position. When the rotor is in the solid position shown in Fig. 6, there is a large gap formed between sector 102 (similarly for sector 103) and depressed portion 89. Consequently, there is little flux in the circuit described and spring 93 holds the reed in its uppermost position.

Firmly attached to legs 78 and 79, respectively, are L-shaped members 104 and 105, the lower extremities of these members extending down into contact with the ends of magnets 81 and 82. At the upper end of members 104 and 105, respectively, there are horizontally directed shunt members 106 and 107, the extremities of the shunts extending inwardly to form small air gaps with sectors 99 and 101, these air gaps being of the same order of magnitude as that formed by depressed portion 89 and these sectors. An attaching yoke 108 is held to magnetic yoke 75 by means of rivets 109 which also hold members 104 and 105 thereto. The rear portion of yoke 108 is curved downwardly and is provided with a pair of holes which receive screws 111, thereby holding the rectifier to the generator frame.

Since reed 72 contacts yoke 75 with its depressed portion 88, the yoke may be used as an electrical connection and thus is shown grounded. Consequently, movement of contact 73 between contacts 96 and 95 may be used to effect full wave rectification. Contact 96 is threaded for adjustability and is received in a transverse member 112, a lock nut 113 being provided for holding the contact in position. A lead 114 is connected to transverse member 112 by a bolt 115 which serves to hold one end of member 112 to the top 76, a similar bolt 116 serving to hold the other end of member 112 to top 76. The contact 95 is riveted to a transverse member 117 which is held to the bottom of top 76 by bolts 115 and 116, the members 112 and 117 being electrically insulated from each other and from top 76 whereby appropriate electrical circuits may be completed by reed 72. An extension 118 on one end of member 117 is connected to lead 71 from the generator and connector 114 is connected to lead 67 from the generator.

When contact 73 engages contact 96 an electrical circuit may be completed through yoke 75, reed 72, and member 112, and when contact 73 engages contact 95, a circuit may be completed through yoke 75, reed 72, and transverse member 117.

When rotor 14 is in the position shown in solid lines in Fig. 6, magnetic circuits are completed from magnets 81 and 82, members 104 and 105, shunt members 106 and 107, sectors 99 and 101, and pole 83. The gaps between shunt members 106 and 107 and sectors 36 and 37 are small so that substantially all of the flux flows through these circuits. The gap from depressed portion 89 to sector 102 (or to sector 103 in a position rotated 180°) is large and thus substantially none of the flux passes through reed 72. Consequently, the reed is not attracted by the rotor and the spring 93 causes the reed to be tilted about pivot 88 to the position shown, with contact 73 engaging contact 96. As the rotor rotates to the position shown dotted in Fig. 6, leading edge of sector 99 approaches the front edge of depressed portion 89 and the trailing edges of sectors 99 and 101 approach the ends of shunt members 106 and 107 (clockwise rotation). In this position, the reed 13 is still in its position shown, but at this point the gap from the front edge of depressed portion 89 to the leading edge of sector 99 is small. Accordingly, there are two flux paths to the magnets, one including reed 72 and the other including the shunt members 106 and 107. As the leading edge of sector 99 approaches the midpoint of depressed portion 89, the trailing edges of sectors 99 and 101 approach the center of the thickness of shunt members 107 and 106 and as the rotor moves a very minute amount more the gap at the shunts 107 and 106 tend to become larger and the major portion of the flux flows suddenly through depressed portion 89. As a result, the reed 72 is suddenly attracted and moves to the downward position shown in Fig. 3 to complete a circuit through contact 95.

Figure 3:
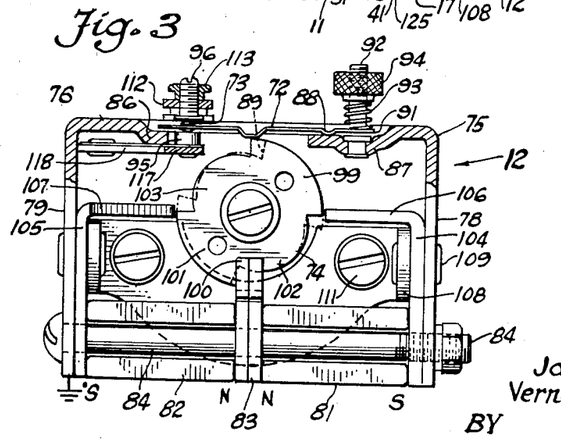
Fig. 3 is an end view on a larger scale taken substantially in the direction of the arrows 3—3 of Fig. 2.

During the movement of the rotor from the position just subsequent to that shown dotted in Fig. 6 to that shown in solid lines in Fig. 3, the reed remains in its lowermost position since the flux paths remain the same. Referring to Fig. 3, when the leading edges of sectors 99 and 101 approach the shunt members 107 and 106, the trailing edge of sector 99 approaches the front of depressed portion 89 and there are two flux paths, one including reed 72 and the other including shunt members 107 and 106. The shunt members divert flux from reed 72 and thus weaken the field therethrough. The reed holds its position until the trailing edge reaches about the middle of depressed portion, at which point the leading edges are cooperating with about half of the thickness of the shunt members 107 and 106. Virtually immediately following the position shown in solid lines in Fig. 3, the shunt members divert all of the flux away from reed 72 and depressed portion 89 since the gap at depressed portion 89 becomes larger while that at shunt members 107 and 106 remains small. Accordingly, the magnetic attraction for reed 72 is released and spring 93 forces the reed to the position shown in Fig. 6 where contact 73 engages contact 96.

The bottom of depressed portion 89 is short along the circumferential direction of rotor 74 and it is spaced downwardly several thicknesses of the metal, preferably about three or four thicknesses. Consequently, the leading edge of sector 99, for example, does not coact magnetically with the main body of reed 72 to the left of depressed portion 26, on clockwise rotation, because the main body thereof forms too large a gap. The leading edge coacts only with the depressed portion. Similarly, when the trailing edge of sector 99 leaves depressed portion 89, there is no coaction with the body of reed 72 to the right of depressed portion 89 because the gap is large. The magnetic circuit with the reed is then suddenly made and broken at the same relative point, that is, when the leading edge and the trailing edge of sector 99 pass about the midpoint of depressed portion 89. The reed remains in each of its positions the same proportion of the total cycle. Like operation occurs when the leading and trailing edges of sector 101 come opposite depressed portion 26.

During counterclockwise rotation of the rotor, the reed operation is substantially identical to that described except that in effect the trailing edges become leading edges. Thus, in Fig. 3 (counterclockwise rotation), in the dotted line rotor position, the shunts 106 and 107 divert the flux away from reed 72 and the reed remains in its uppermost position. As the rotor 36 approaches the position shown in solid lines, two flux paths are provided and it moves past this position, the shunts become ineffective, and the reed is suddenly attracted downward to the position shown. Due to the downward displacement of depressed portion 89, the edge of sector 99 cooperates only therewith and not with the body to the right thereof. Similarly, when continuing counterclockwise rotation the position shown in dotted lines in Fig. 6 is reached, and the shunts are about to become effective to direct flux away from reed 72. Slight movement beyond this position and the gap at depressed portion 89 is increased, whereupon the spring moves reed to the position shown. Also due to the downward displacement of portion 89, the sector 99 coacts only therewith and not with the main body of the reed. Consequently, reed operation occurs substantially when the leading and trailing edges of the sectors move past the center of the depressed portion.

Since the gaps between depressed portion 89 and the rotor sectors and between the shunt members 106 and 107 and the sectors change when the edges of the sectors move past the center of the depressed portion, the effective point of operation under depressed portion 89 remains the same distance from fulcrum or pivot 24 irrespective of the direction of rotation. Hence, the lever arm against which the spring 39 operates remains the same and with a fixed adjustment thereof the operation remains symmetrical. That is, the reed operation is the same irrespective of the direction of rotation.

The point at which the reed operates may be changed or adjusted slightly by tightening or loosening the nut 94.

The reed 13 lies in channel 85 substantially in between the thickness of the metal forming the top 76, the channel being sufficiently wide so that there is an air space of several reed thicknesses on each side thereof. The flux from the magnets 81 and 82 must flow through the fulcrum 88 and cannot jump from the sides of channel 85 to the reed. The reed is therefore in a substantially field free space so that external fields cannot affect its operation, particularly its symmetrical operation when rotation is reversed. This is of importance in units operating at high speeds since small extraneous fields will affect the point at which reed operation occurs. Substantially central of channel 85 so as to surround the depressed portion 89 there is a circular cutout portion 119, the function of which is to prevent any leakage flux from the top 76 to sectors 99 and 101 when these sectors approach and are in a vertical position. All the flux must flow through the fulcrum 88 and depressed portion 89 of the reed. This also is of advantage during high speed operation. The reed has some inertia and consequently a small amount of time elapses before movement occurs. This is minimized by making the reed light in weight and the extraneous effects caused by leakage and stray fields are reduced as described. The weight of the reed and stiffness of spring 93 may be chosen so that the natural frequency of vibration of the reed is beyond the frequency of reed movement. Hence there is little tendency for the reed to bounce away from the contacts at high speed operation.

The rotor 74 being driven by shaft 34 operates the rectifier in proper synchronism with the generated voltage impulses. With the generator coils 35 and 36 connected to the stationary rectifier contacts as shown in Fig. 16, and with the generator and rectifier construction as described, proper operation of the rectifier contact 73 occurs when rotor 74 is connected to shaft 34 so that the trailing edge of sector 99 is central of depressed portion 89 as shown in Fig. 7 when generator rotor 33 is horizontal. A small rotor movement clockwise from this position will result in the reed moving to the position in Fig. 6 whereas prior to this it occupies the position in Fig. 3.

Referring to Figs. 7, 15 and 16, the horizontal position of rotor 33 corresponds to the origin $d$ at which point the voltage being generated is zero and is prior to beginning its rapid rise. Hence the rotor 74 is adjusted so that the trailing edge of sector 99 is just ready to leave the center of depressed portion 89 and a very small movement therebeyond causes reed 72 to move upward and close contacts 73 and 96. The voltage being zero, no sparking occurs at the contacts. Rotor 74 may be so adjusted that reed moves upwardly when rotor 33 is exactly horizontal (at origin $d$). Both coils 35 and 36 are generating voltage but only that of coil 35 is flowing through the external circuit from terminal 25 through conductor 121, meter 122, conductor 123 to ground, and from ground to reed 72. Contacts 73 and 96 remain closed until one quarter of a revolution later when the leading edge of sector 101 comes under depressed portion 89. At this point rotor 33 has traversed to the vertical position (Fig. 10), where the voltage is zero (at $h$) and the sector 101 causes contact 73 to move away from contact 96 and into engagement with contact 95. Now only winding 36 is supplying current. No sparking occurs because of the zero voltage, and during the subsequent quarter revolution until the trailing of sector 101 reaches depressed portion 89 (at l) contacts 73 and 95 remain closed. The windings 35 and 36 are so wound that the direction of the voltage generated therein is the same during any quarter revolution as shown by the arrows. But by connecting to a common center tap 25 of the windings, in effect the center tap of a single winding, when the direction of voltage generated has changed, the contacts are changed also, with the result that the output voltage is always in the same direction. The second quarter revolution thus produces the second peak, shown dot-dash in Fig. 15.

At the end of the second quarter revolution rotor 33 is again horizontal but sector 56 thereof is on top (at l Fig. 15). At this point, the voltage is zero and the trailing edge of sector 101 causes the reed to move upwardly and close contacts 73 and 96 to connect coil 35 in circuit again. A quarter of a revolution later the voltage is at zero again and the leading edge of sector 99 is about to cause contacts 73 and 95 to be closed. This cyclic operation continues, there being four voltage pulses with each revolution.

By having the voltage zero for a substantial interval on each side of points h and l, for example, small variations in the timing of contact operation do not produce any change in voltage output since the voltage is still zero at contact operation. Small inaccuracies in the position of rotor 74, small reed inertia, and other extraneous factors are thus compensated for. This also allows for symmetrical operation on reverse rotation and may be seen as follows. Suppose that the voltage wave generated is that shown by curve 64 wherein there is a gradual voltage change on each side of a peak and suppose for one direction of rotation for a particular speed the rotor adjustment is such that commutation occurs at h and there is no sparking. But due to a small discrepancy in the position of rotor 74 contact operation does not occur at h and l but at $h_1$ and $l_1$, when the direction of rotation is reversed. On curve 64 there is a voltage at these points, and if operating thereon, there would be sparking at the contacts. On curve 66, however, there is no voltage at these points and no sparking occurs. Consequently the calibration of meter, once made, is correct for either direction of rotation.

Full wave rectification together with two complete cycles during each revolution produces four impulses during each revolution whereby sufficient impulses are fed into the meter at low speeds to produce an accurate indication.

With the rotors 32 and 33 having their sectors of equal angular length and having centers of the small sectors displaced outwardly thereby producing sharp variations from zero to rising voltage, the percentage of time of zero voltage and generated voltage remains the same and does not vary the speed. Hence, as the speed increases the meter receives the same kind and shape of voltage impulses and receives a number of them greater in amount and greater in amplitude proportional to the speed increase. Since the wave shape remains fixed, the effect of increased frequency on the meter indication is negligible and the meter indication will then be proportional to the amplitude which, in turn, is proportional to the speed.

Figure 1:
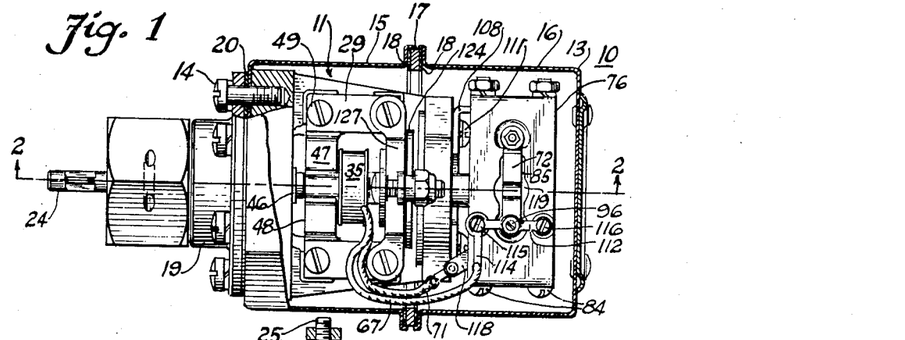
Fig. 1 is a top view partially in section of generator and rectifier apparatus embodying the invention.
Figure 2:
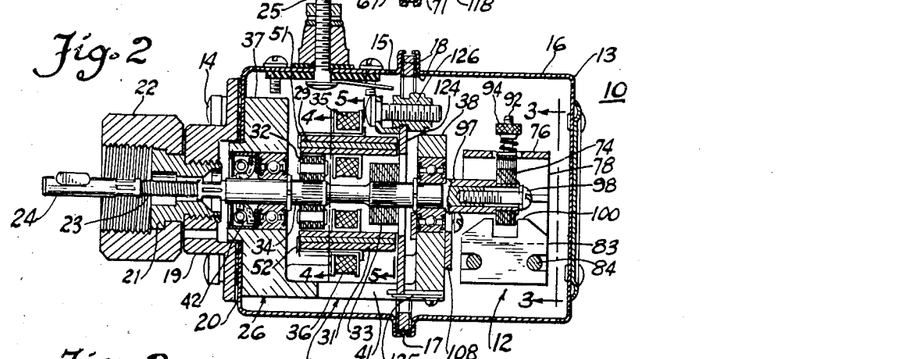
Fig. 2 is a sectional view taken substantially along the lines 2—2 of Fig. 1.

A magnetic shunt member 124 which is a ring of magnetic metal is placed in proximity to central legs 44 and 44a, Figs. 1 and 2. The shunt is held on a strip of metal 125 attached to frame 26 and is held in position by a nut 126 held on a yoke 127. By rotating nut 126 the spacing of shunt 124 from legs 44 and 44a may be varied. This diverts some flux from rotors 32 and 33 and thus the output voltage may be varied somewhat. The shunt permits uniform calibration of the generator to account for manufacturing tolerances and other variations.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described the invention, what is claimed and desired to be secured by Letters Patent is:

1. Apparatus for generating a voltage wave having voltage impulses separated by intervals of substantially zero voltage with a rapid rate of change from zero voltage to said impulses comprising, a stationary magentic structure, windings associated therewith, and an inductor rotatable relative thereto, said inductor comprising one pair of diametrically opposed sectors having a constant radius and another pair of diametrically opposed sectors in alternation with said one pair, said other pair of sectors having uniformly varying radius.

2. Apparatus for generating a voltage wave having voltage impulses separated by intervals of substantially zero voltage with a rapid rate of change from zero voltage to said impulses comprising, a stationary magnetic structure, windings associated therewith, and an inductor rotatable relative thereto, said inductor comprising one pair of diametrically opposed sectors having a constant radius and another pair of diametrically opposed sectors in alternation with said one pair, said other pair of sectors having a uniformly varying radius less than the radius of said one pair thereby defining a non-uniform gap with said magnetic structure.

3. Apparatus for generating a voltage wave having voltage impulses separated by intervals of substantially zero voltage with a rapid rate of change from zero voltage to said impulses comprising, a stationary magnetic structure, windings associated therewith, and an inductor rotatable relative thereto, said inductor comprising one pair of diametrically opposite sectors having a constant radius and another pair of diametrically opposed sectors in alternation with said one pair, said other sectors having a radius less than the radius of said one pair and being constructed from centers displaced radially outwardly from the center of said one pair of sectors.

4. A generator structure comprising, a pair of pole pieces forming a source of flux, a pair of segmented rotors having their axes ninety degrees displaced adapted to rotate relative to said pole pieces, and windings disposed on said pole pieces intermediate said rotors, each rotor comprising one pair of diametrically opposite sectors having a constant radius and another pair of diametrically opposite sectors in alternation with said one pair, said other sectors having a radius less than the radius of said one pair and being constructed from centers displaced radially outwardly from the center of said one pair of sectors.

5. Generating apparatus comprising, a source of magnetic flux, a pair of pole pieces associated therewith, windings disposed on said pole pieces, a revolvable rotor disposed on one side of said windings forming a low reluctance path for flux from said source through said pole pieces during a portion of a revolution and forming a high reluctance path during another portion of its revolution, and another revolvable rotor disposed on the other side of said windings for diverting flux from said pole pieces during the high reluctance portion of said one rotor revolution.

6. Generating apparatus comprising, a pair of pole pieces, a source of flux, said pole pieces and said source being related whereby the direction of flux through said pole pieces is always the same, windings on said pole pieces, one revolvable rotor disposed on one side of said windings forming a low reluctance path for flux from said source through said pole pieces during a portion of its revolution and forming a high reluctance path during another portion of its revolution, a second revolvable rotor disposed on the other side of said windings forming a low reluctance path for flux from said source during said one rotor's high reluctance path and forming a high reluctance path for flux from said source during said one rotor's low reluctance path.

7. Generating apparatus comprising, a pair of pole pieces, a source of flux, windings on said pole pieces, one revolvable rotor disposed on one side of said windings for completing a flux path from said source through said pole pieces, and another revolvable rotor disposed on the other side of said windings for completing a path shunting flux from said source away from said pole pieces.

8. Generating apparatus comprising, a pair of pole pieces; a source of flux; windings on said pole pieces; one rotor revolvable relative to said pole pieces and disposed on one side of said windings; said one rotor comprising a pair of diametrically opposite sectors having a constant radius and another pair of diametrically opposite sectors in alternation with said one pair, said other sectors having a radius less than the radius of said one pair and having centers displaced radially outward from the center of said one pair of sectors; said one rotor completing a flux pathway through said windings having high and low reluctance alternately; and a second rotor revolvable relative to said pole pieces and disposed on the other side of said windings, said other rotor comprising a pair of diametrically opposite sectors having a constant radius and another pair of diametrically opposite sectors in alternation with said one pair, said other sectors having a radius less than the radius of said one pair and having centers displaced radially outward from the center of said one pair of sectors; said other rotor completing a path diverting flux from said windings when said one rotor completes a flux path of high reluctance.

9. Generating apparatus comprising, a pair of pole pieces, a source of flux, windings on said pole pieces, and a rotor having alternate sectors of greater and lesser radii rotatable relative to said pole pieces for alternately producing a small and a large air gap respectively, the sectors of increased radius having the center of rotation as a center and the sectors of lesser radius having their centers spaced radially outward from the center of rotation thereby providing an air gap greater than that effected by the central portion of said sectors of lesser radius adjacent the junction of the alternate sectors.

10. Generating apparatus comprising, a pair of pole pieces, a source of flux, windings on said pole pieces, and a rotor rotatable relative to said pole pieces for producing sequential periods of constant flux of one value, variable increasing flux, constant flux of a greater value and variable decreasing flux through said windings, said rotor including means for providing a rapid rate of change of flux at the initial and terminal portions of said constant flux periods.

11. Generating apparatus comprising, a pair of pole pieces, a source of flux, windings on said pole pieces, one rotor rotatable relative to said pole pieces on one side of said windings for producing alternate periods of constant flux and variable flux through said windings, said one rotor including means for providing a rapid rate of change of flux at the initial and terminal portions of said constant flux periods, and a second rotor rotatable relative to said pole pieces on the other side of said windings for diverting flux therefrom during a portion of the revolution of said one rotor.

12. Generating apparatus comprising, a pair of pole pieces, a source of flux, windings on said pole pieces, one rotor rotatable relative to said pole pieces on one side of said windings for producing alternate periods of constant flux and variable flux through said windings, said one rotor including means for providing a rapid rate of flux change at the initial and terminal portions of said constant flux periods, a second rotor rotatable relative to said pole pieces on the other side of said windings for diverting flux therefrom during a portion of the revolution of said one rotor, and means for shunting a portion of the flux from said source away from said one rotor.

13. A reversible direct current generator comprising, rotating means for generating alternate positive and negative voltage pulses separated by intervals of zero voltage with rapid changes in voltage at the initial and terminal portions of said zero voltage intervals, stationary contact means for receiving said voltage pulses, a magnetic vane including a contact movable from one of said stationary contacts to the other during said intervals of zero voltage, a source of constant magnetic flux, and sectored rotor means operated by said rotating generating means making and breaking a magnetic circuit from said source of constant flux through said vane for operating said movable contact.

14. A reversible direct current generator comprising, means for generating alternate positive and negative voltage pulses separated by intervals of zero voltage with rapid changes in voltage at the initial and terminal portions of said zero voltage intervals, means including a movable vane for commutating one of said positive and negative pulses, a source of constant magnetic flux, and means for directing flux to and from said vane from said source for operating said commutating means during said intervals of zero voltage.

JAMES H. NILSON.
VERNON C. WESTBERG.

REFERENCES CITED

The following references are of record in the file of this patent:

UNITED STATES PATENTS

| Number | Name | Date |
|---|---|---|
| 1,142,047 | Milton | June 8, 1915 |
| 1,515,971 | Sethman | Nov. 18, 1924 |
| 1,768,750 | Dicke | July 1, 1930 |